United States Patent [19]
Yamunachari et al.

[11] Patent Number: 5,930,476
[45] Date of Patent: *Jul. 27, 1999

[54] APPARATUS AND METHOD FOR GENERATING AUTOMATIC CUSTOMIZED EVENT REQUESTS

[75] Inventors: Sundararajan Yamunachari; Govindarajan Rangarajan, both of Sunnyvale, Calif.

[73] Assignee: Sun MicroSystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/654,903

[22] Filed: May 29, 1996

[51] Int. Cl.$^6$ .................................................. H04L 12/26
[52] U.S. Cl. ............................... 395/200.54; 395/200.57
[58] Field of Search .......................... 395/200.11, 200.01, 395/200.02, 200.09, 200.1, 200.54, 200.3, 200.5, 200.57

[56] References Cited

U.S. PATENT DOCUMENTS

| | | | |
|---|---|---|---|
| 4,748,654 | 5/1988 | Gray | 379/40 |
| 5,109,486 | 4/1992 | Seymour | 395/200.54 |
| 5,329,619 | 7/1994 | Page et al. | 395/200.01 |
| 5,542,047 | 7/1996 | Armstrong | 395/200.54 |
| 5,606,664 | 2/1997 | Brown et al. | 395/200.1 |
| 5,619,656 | 4/1997 | Graf | 395/200.11 |
| 5,627,766 | 5/1997 | Beaven | 364/551.01 |
| 5,638,514 | 6/1997 | Yoshida et al. | 395/200.11 |
| 5,652,839 | 7/1997 | Giorgio et al. | 395/200.54 |
| 5,706,210 | 1/1998 | Kumano et al. | 395/200.54 |

OTHER PUBLICATIONS

Sun Microsystems, Inc., "Soltice X.400 and Solstice X.500 Technical Brief," Apr. 1996, pp. 1–47.

*Primary Examiner*—Meng-Ai T. An
*Assistant Examiner*—Gautam R. Patel
*Attorney, Agent, or Firm*—Flehr Hohbach Test Albritton & Herbert LLP

[57] ABSTRACT

A network management system allows a user to generate a customized event request for network accessible devices. In response to a user request the system displays a list of devices, and a list of predefined event requests. In response to user customization commands the system generates customized event requests by associating various ones of the displayed devices with various ones of the displayed predefined event requests. At most one predefined event request is associated with each device. The network management system periodically sends the customized event requests to the devices with which they have been associated, and receives response messages from those devices. A display or report may be generated showing the status of the responding devices, using the information in the received response messages. A predefined event request may be formed by storing one or more variable/threshold pairs in a predefined event request data structure. The network management system allows an administrator to define or change the system by associating devices with predefined event requests, eliminating the need to write or modify computer programs.

22 Claims, 4 Drawing Sheets

FIGURE 4
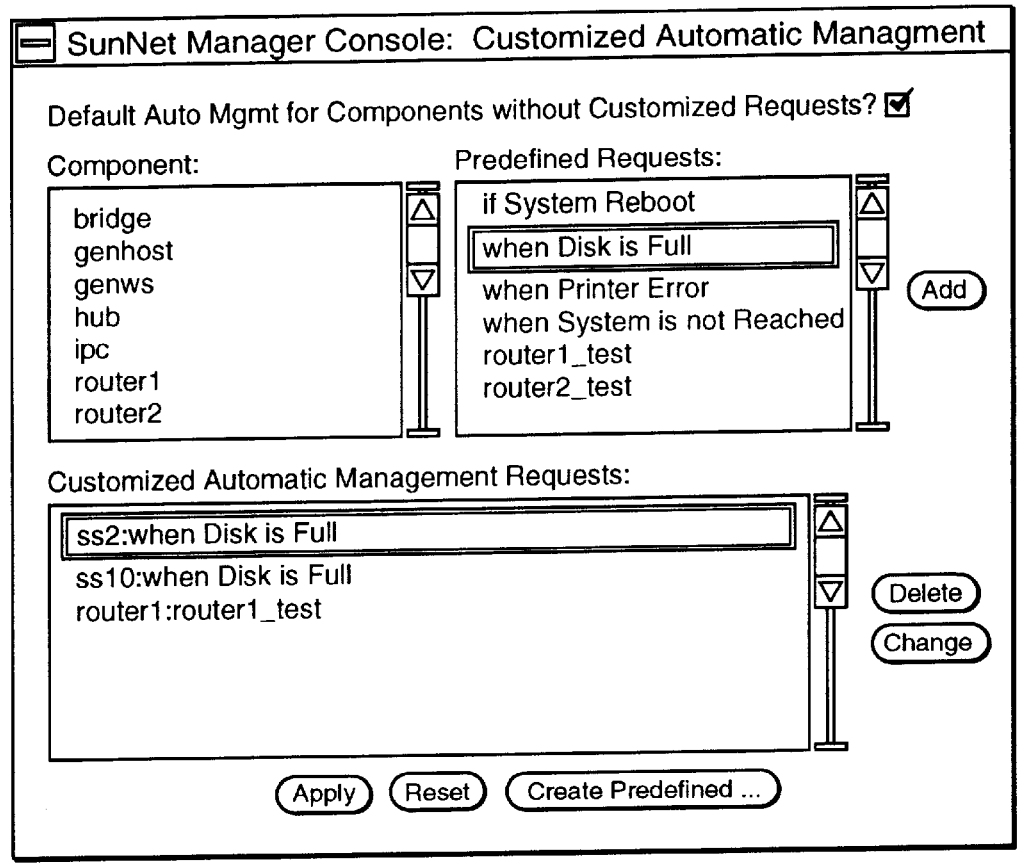
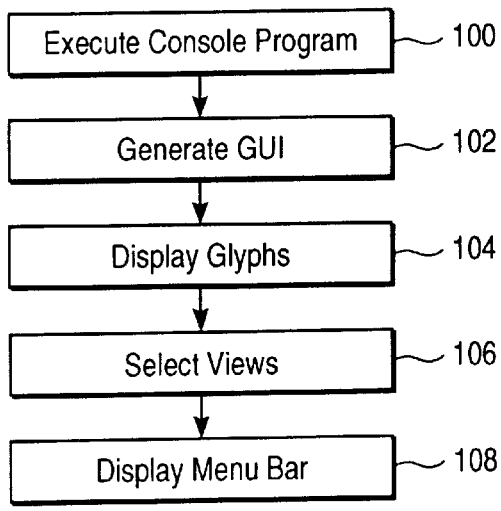
FIGURE 5

APPARATUS AND METHOD FOR GENERATING AUTOMATIC CUSTOMIZED EVENT REQUESTS

BACKGROUND OF THE INVENTION

The present invention relates to digital communications. More specifically, the present invention relates to network management.

Today, large numbers of personal computers and workstations are being interconnected with file servers, print servers, modems, hubs and other devices to form local area networks, metropolitan area networks and wide area networks. These networks allow the personal computers and workstations to share information and valuable resources among each other. Now more than ever, individuals and companies depend on networks to conduct business and to communicate with people around the world. Indeed, the network has become the computer.

Most networks use a network manager and some form of Simple Network Management Protocol (SNMP) for managing the network. Among its management tasks, the network manager automatically monitors the status of the devices on the network. The network manager sends predefined event requests to the devices, which are requested to return responses when certain events occur. For example, a disk agent might be requested to send a response if available disk space falls below 50%. There are times when an event request might not define important events for a device, especially when the device is manufactured by more than one vendor. An SNMP-manageable device stores in its memory a Management Information Base (MIB), a collection of objects or variables representing different aspects of the device (e.g., configuration, statistics, status, control). For each class of device, the MIB has a core of standard variables. Each vendor of a device will add to the core, variables that it feels are important to the management of its device. Thus, the MIB for a router from a first vendor might be different from the MIB for a router from a second vendor, and an event request that defines important events for the one router might not necessarily define the same important events for the other router. This is a problem with network managers.

Another problem is that current network managers do not easily allow the health of the devices to be defined. The health is "hard-wired" into the event requests. Yet the desired definition of a healthy device or system might not concur with the predefined definitions. For example, a router could have five devices attached, two of which are redundant. Even if one of the redundant devices is bad, the router is still good. However, the network manager would indicate that the router is bad.

SUMMARY OF THE INVENTION

These problems are overcome by methods, computer storage medium and apparatus according to the present invention. A method of monitoring a plurality of network devices comprises the steps of reading a plurality of predefined event requests from computer memory; associating at least some of the devices with the predefined event requests; and sending the predefined event requests to their associated devices.

A method of generating an event request for a network device comprises the steps of forming a plurality of predefined event requests; and associating one of the plurality of predefined event requests with the device. At least two of the plurality of predefined event requests are formed by different attributes lists.

A computer storage medium stores a plurality of executable instructions which instruct a computer to automatically monitor a plurality of network devices. The plurality of instructions comprises instructions which instruct the computer to read a plurality of predefined event requests; instructions which allow the computer to associate the predefined event requests with at least some of the network devices; and instructions which instruct the computer to send the predefined event requests to their associated devices.

Apparatus for automatically monitoring a plurality of devices on a network comprises memory for storing a plurality of different predefined event requests; and a processor for reading the predefined event requests, associating appropriate event requests with at least some of the devices in response to user inputs, and firing the associated event requests.

A network manager for communicating with a plurality of network agents comprises a computer that is programmed to read a plurality of predefined event requests; associate the predefined event requests with the plurality of agents; and send the predefined event requests to their associated agents.

BRIEF DESCRIPTION OF THE DRAWINGS

FIG. 4 is an illustration of a dialog box for customizing event requests, the dialog box being generated by the network manager according to the present invention;

FIG. 5 is a flowchart of initial steps performed by the network manager according to the present invention;

Figure 7:
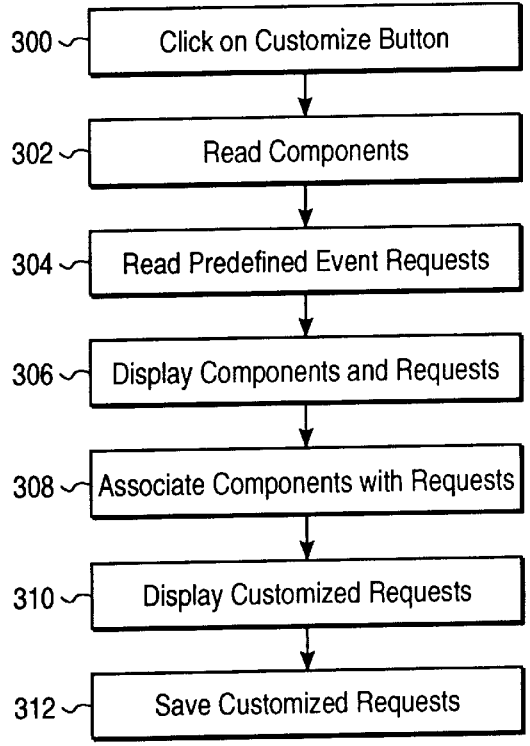
Figure 8:
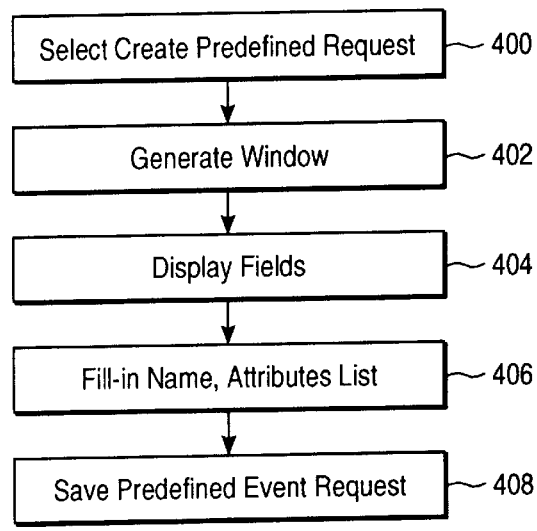

FIG. is a flowchart of steps for monitoring the health of the work;

FIG. 7 is a flowchart of steps for creating customized requests; and,

FIG. 8 is a flowchart of steps for creating a predefined event request.

DETAILED DESCRIPTION OF THE INVENTION

Figure 1:
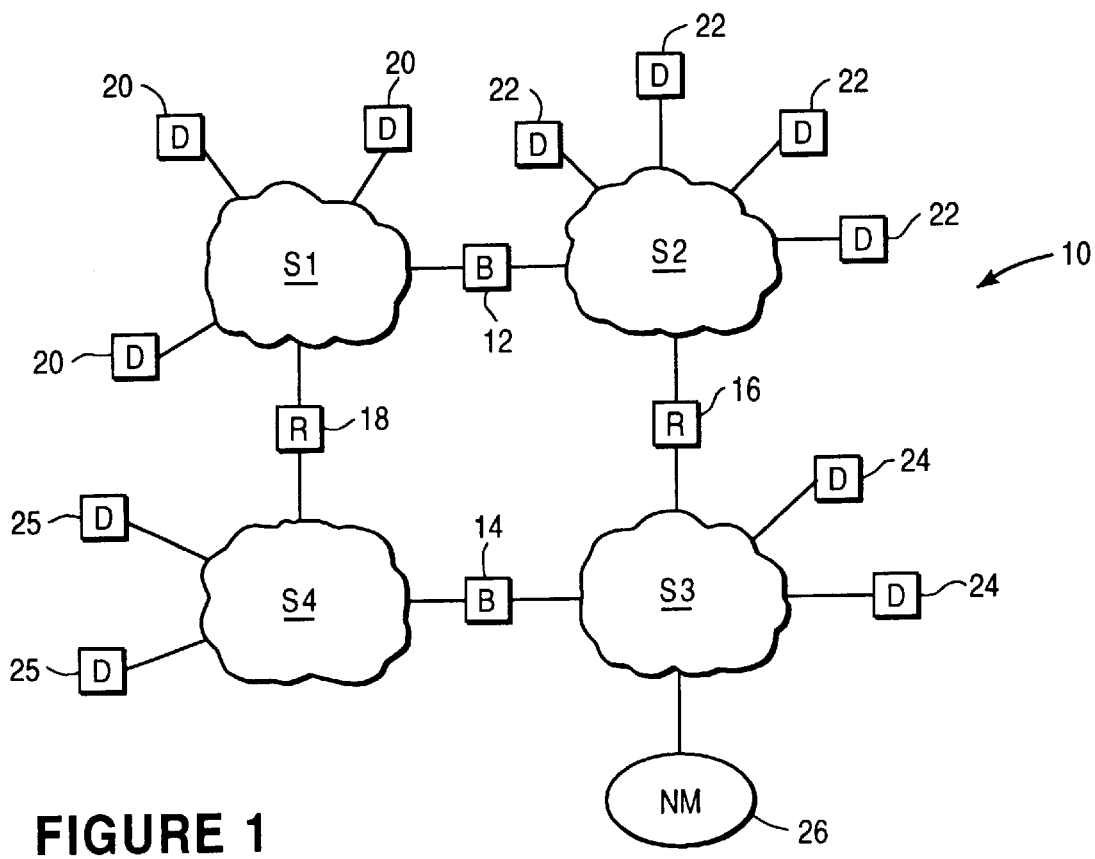
FIG. 1 is a schematic diagram of an internet including a network manager according to the present invention.

FIG. 1 shows an internet 10 including first, second, third and fourth subnetworks S1, S2, S3 and S4 that are interconnected by intermediate systems 12, 14, 16 and 18. For illustrative purposes only, the first and second subnetworks S1 and S2 are of a first topology, such as Token ring, the third and fourth networks S3 and S4 are of a second topology, such as Ethernet, the first and second intermediate systems 12 and 14 are bridges 12 and 14, and the third and fourth intermediate systems 16 and 18 are first and second routers 16 and 18. The first router 16 is manufactured by one vendor and the second router 18 is manufactured by a different vendor. MIBs of the first and second routers 16 and 18 have the same core of variables, but they have different variables added to their cores. Thus, the MIBs of the first and second routers 16 and 18 are different.

The first subnetwork S1 includes a first group of addressable devices 20, the second subnetwork S2 includes a second group of addressable devices 22, the third subnetwork S3 includes a third group of addressable devices 24, and the fourth subnetwork S4 includes a fourth group of addressable devices 25. The addressable devices 20, 22, 24 and 25 can be devices such as workstations, personal computers, printers and hubs. Each device 20, 22, 24 and 25 is associated with an MIB and an agent. The agent is a software program that may or may not be resident in the device. TCP/IP is used to regulate how data is packeted and transported between the devices 20, 22, 24 and 25. Each device 20, 22, 24 and 25 has a physical or medium access control (MAC) address and a unique IP address.

The internet 10 also includes a network manager 26, which is connected to the third subnetwork S3 and which has access to the MIB of each device 20, 22, 24 and 25. SNMP is the protocol used for managing the devices 20, 22, 24 and 25. The agents allow a network manager to access the MIB of each device. Such accessibility allows the network manager to control operations of the agents, analyze resource performance, identify and resolve faults, and automate management tasks. For example, the network manager can request an agent to change the value of a variable in the MIB of a device, and it can request an agent to send out a response when an event occurs, such as a MIB variable exceeding a threshold. For a general description of network management, see W. Stallings, "Data and Computer Communications", MacMillan (4th ed, 1994) pp. 701–24, which is incorporated herein by reference.

Figure 2:
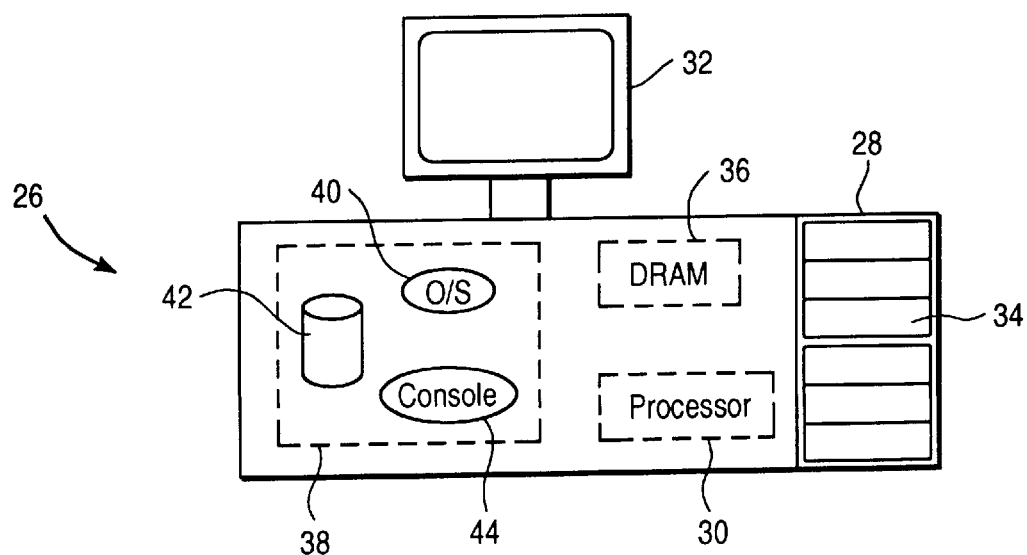
FIG. 2 is a block diagram of the network manager according to the present invention.

FIG. 2 shows the network manager 26 in greater detail. The network manager 26 includes a workstation 28 such as a SPARCstation™ or SPARCserver™. Both of these workstations use a RISC-based high-performance "SPARC" microprocessor 30. The SPARCstation™, SPARCserver™, and "SPARC" microprocessor are all commercially available from Sun Microsystems, Inc., the assignee of the present invention. The workstation 26 is configured with a color display monitor 32 and a CD ROM drive 34 for distribution media. It is also configured with volatile memory 36 (e.g., 32 Mbytes of DRAM) and non-volatile memory 38 (e.g., a 400 Mbyte hard drive).

Software for the network manager includes a "UNIX"-based operating system 40. Operating systems for the "SPARC" microprocessor include "SOLARIS" 2.4 or greater and "SOLARIS" 1.x or later. The "SOLARIS" operating systems are also commercially available from the assignee of the present invention. The operating system 40 is stored on a portable computer memory medium (e.g., a CD ROM) and loaded onto the non-volatile memory 38 from the CD ROM drive 34.

Additional software for the network manager 26 includes a network topology database 42 and a Console program 44 that automatically displays and manages the devices indicated by the network topology database 42. The Console program 44 can be stored on a portable computer medium and loaded onto the non-volatile memory 38 from the CD ROM drive 34. The network topology database 42 can be created dynamically by a discover tool, which is executed by the workstation 26. The network topology database 42 is also stored in the non-volatile memory 38.

Figure 3:
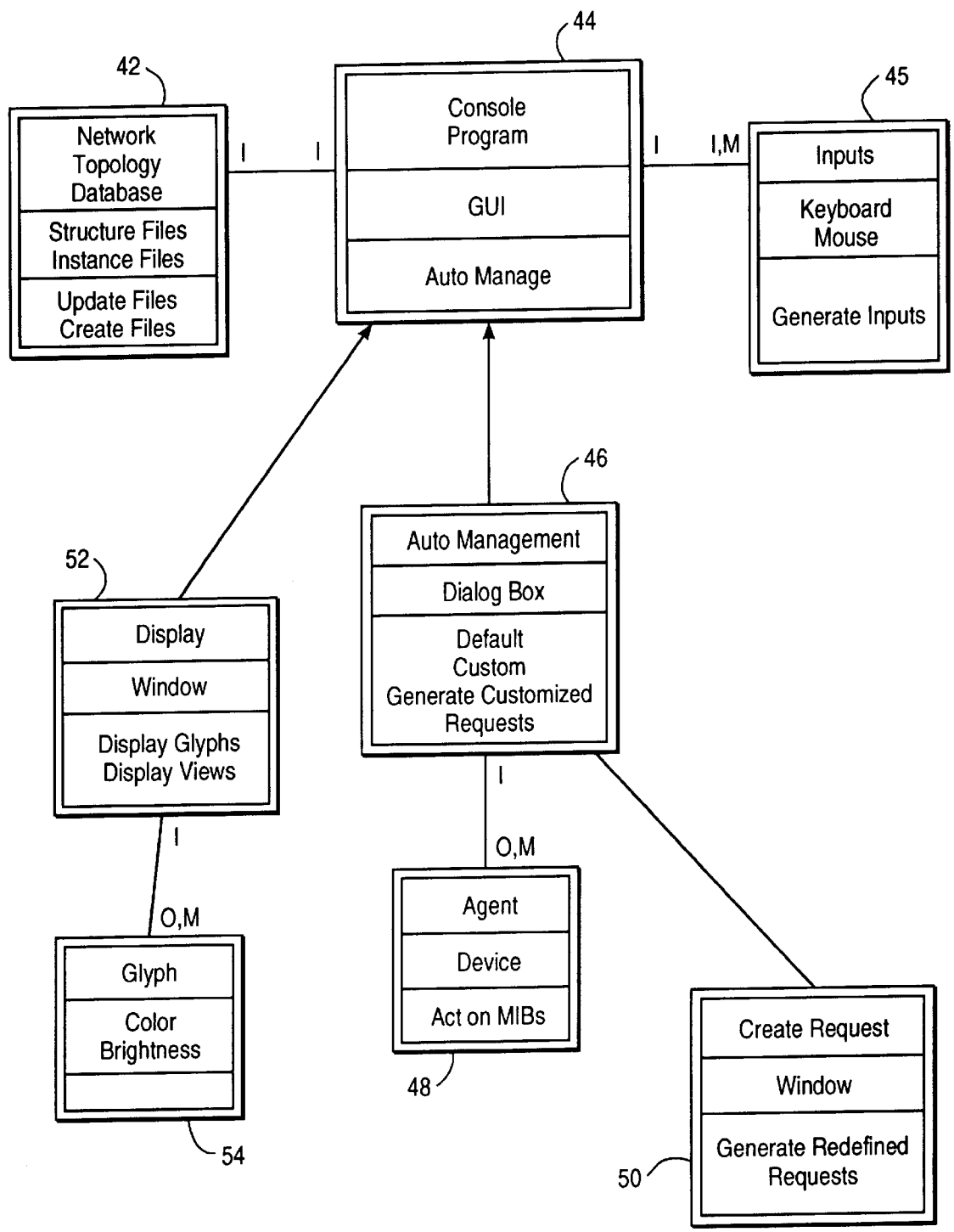
FIG. 3 is a static object oriented model of software that is executed by the network manager according to the present invention.

Referring now to FIG. 3, the network topology database 42 is a collection of structure or schema files and instance files that describe the internet 10. Four basic elements are components (e.g., printers, routers, workstations), views (collections of elements, including other views), buses (e.g., a Token Ring segment) and connections (e.g., an RS-232 link). Structure files for other elements can be added to the network topology database 42. Each structure file includes a number of records that describe the structure of a particular element. The instance files contain instances of structure files for the elements that have been discovered on the internet 10. For a description of network topology databases, see C. Malamud, "Analyzing Sun Networks", Van Nostrand Reinhold (1992) pp. 419–21, which is incorporated herein by reference.

The Console program 44 includes an object-oriented, graphical user interface (GUI). The GUI can be derived from OpenWindows™ 3.1 or later or any other library of classes for GUIs. Inputs 45 are supplied to the GUI via a mouse and a keyboard. When executed, the Console program 44 displays a menu bar that allows the various features described below to be selected.

The Console program 44 has an Auto Management feature 46 that monitors the health of the internet 10. When the Auto Management feature is selected, a "Properties" dialog box is displayed. The Properties dialog box offers the following options:

Automatic Management: Enable/Disable

Management Behavior: Default/Custom Customize button

Automatic Management is performed when the Enable button is selected. Event requests are automatically started for the devices 20, 22, 24 and 25 in the network topology database 42. The event requests are repeated at every polling interval. For example, a polling interval of 600 would cause event requests to be sent every 600 seconds. When an event request is fired, it is sent to an agent 48 of the device at the destination address specified in the event request's outer message wrapper.

If the Default button for Management Behavior is also selected, one of the following default event requests is sent at every polling interval (with order preserved):

(1) SNMP Event Request(ifoperStatus not equal to 1).

(2) Hostperf Event Request(upTime increased by <number>).

(3) ICMP echo Event Request(reachable equal to false).

What these default event requests determine is whether the devices 20, 22, 24 and 25 in the network topology database 42 are operative. If a device supports SNMP, the network manager 26 sends the SNMP Event Request to the device. If ifOperStatus is not equal to 1, an event is generated. If the device does not support SNMP, but does support Hostperf, the network manager 26 sends the Hostperf Event Request to the device. If upTime has increased by a number such as 1, an event is generated. Instead of OperStatus not being equal to 1 and upTime being increased by 1, other criteria can be used to generate events. If the device does not support SNMP or Hostperf, it is sent an ICMP Event Request, which requests the device to send back a response indicating reachability.

If the Custom button for Management Behavior is selected instead of the Default button, the network manager 26 sends customized event requests to associated component types. The customized event requests are read from the network topology database 42.

The Auto Management feature 46 allows the customized event requests to be generated. By clicking on the Customize button, a Customize popup dialog box appears. The Customize popup dialog box shown in FIG. 4 includes three columns: a Component column, a Predefined Request column and a Customized Automatic Management Requests column. The Component column lists the components (e.g., bridge, genhost, genws, hub, ipc, router1, router2), which are read from the network topology database 42. Note that router1 and router2 correspond to the first and second routers 16 and 18, which were manufactured by different vendors. The components that are displayed might not constitute all of the devices 20, 22, 24 and 25 on the internet 10, but only those devices in a particular cluster or view. The Predefined Request column lists the predefined requests (e.g., if_System_Reboot, when_Disk_is_Full, when_Printer_Error, when_System_is_Not_Reachable, router1_test, router2_test), which are read from a Predefined Request file stored in the non-volatile memory 38. Note that the router1_test for the first router 16 is different than the router2_test for the second router 18.

Customized event requests are generated by associating the components in the Components column with the predefined event requests in the Predefined Request column. A component and a predefined event request could be associated, for example, by selecting a component from the Component column and a predefined event request from the Predefined Requests column. The Customized Automatic Management Requests column lists the pairs of associated components/requests. For example, router1 from the Component column and router1_test from the Predefined Request column are selected, and the router1:router1_test is displayed in the Customized Automatic Management Requests column. Only one predefined request is associated with each component type. This is done to reduce traffic on the internet 10. Besides, multiple requests for a device are not really needed since each predefined event request can define multiple events. The predefined event requests displayed in the Customized Automatic Management Requests column are stored in the network topology database 42 in the instance files of their associated component. It is once again noted that the Customize dialog box of FIG. 4 is merely exemplary, and that the interface for associating the components and predefined event requests is left up to the designer of the Console program 44.

When the box for Default Auto Mgmt for Components w/o Customized Requests is checked (near the top of the dialog box in FIG. 4), the default event requests are sent as described above to the devices that have not been associated with predefined event requests. That is, one of default requests (1), (2) and (3) is sent to each of the devices that have not been associated with predefined event requests. If the button is not checked, no event requests at all are sent to those devices.

When the Create Predefined button (at the bottom of the dialog box in FIG. 4) is clicked on, a Create Request window 50 is displayed. The Create Request window 50 allows a predefined event request to be created. For a general illustration of an event request, see C. Malamud, "Analyzing Sun Networks", Van Nostrand Reinhold (1992) pp. 421–24. The Create Request window 50 displays certain fields of a predefined event request and allows the user to fill in a name of the predefined event request (e.g., Disk_Available) and an attributes list. For example, three pairs of variables/thresholds are added to the attributes list. One of these pairs defines events based on disk availability. This allows the Disk_Available event request to instruct the genws to return Response messages when disk availability exceeds 15%. Similarly, the router1_test event request could query the attributes related to the first router's interface status and send an event when all of the interfaces are down. The threshold is selected solely at the discretion of the network administrator or other superuser. After the fields are filled out, a save button is clicked on and the predefined event request is added to the Predefined Request file. Even though different devices have different functionalities, the event requests can be configured for the device under consideration. Thus, the network administrator can define the health of the device.

The Console program 44 also has a Display feature 52 that allows the devices 20, 22, 24 and 25 in the network topology database 42 to be displayed. The devices 20, 22, 24 and 25 are represented by glyphs 54. Glyphs 54 have attributes such as color and brightness that provide additional information about the devices they represent.

The Display feature 52 can display different views of the devices 12–22 of the internet 10. The views can be arranged in different ways. Views of desired system resources can be displayed. For example, a single view of all managed routers on the network could be displayed, regardless of the actual location of the routers in the network hierarchy. Or, views of devices can be arranged in a hierarchy to depict various levels of the internet 10. The highest level of the hierarchy, the internet 10, can be displayed as a network glyph. The network administrator can "navigate" through the internet 10 by simply pointing a mouse and double clicking the glyph which refers to the view. Double-clicking the network glyph of the internet 10 would cause the Console program 44 to display the next level, which would include cloud glyphs for the subnetworks S1, S2, S3 and S4, glyphs of the intermediate systems 12–18, and glyphs of the physical links.

Certain colors can notify the network administrator of events relating to a device. Perhaps the event was a router that went down or a hard drive having less than 10% of disk space available. A glyph for any of these devices could be set to a color such as red. If available disk space increased to 50%, the glyph could be changed to an orange color. If the disk space availability increased to 75%, the color of the glyph could be changed to green.

Event requests can be sent manually to selected devices. By clicking the glyph menu of the selected device, the network manager 26 looks up the associated event request in the network topology database 42 and fires the event request to the selected device.

FIGS. 5 to 8 show the operation of the network manager 26. Reference is made first to FIG. 5. When the Console program 44 is executed (step 100), the network manager 26 generates the GUI (step 102). The GUI displays the glyphs 54 (step 104). The network manager 26 can color-code the glyphs in response to the responses from the devices. Using a mouse or keyboard, the user selects a particular view of the network (step 106). The GUI also displays the menu bar (step 108) which allows the Auto Management feature 46 to be selected.

Figure 6:
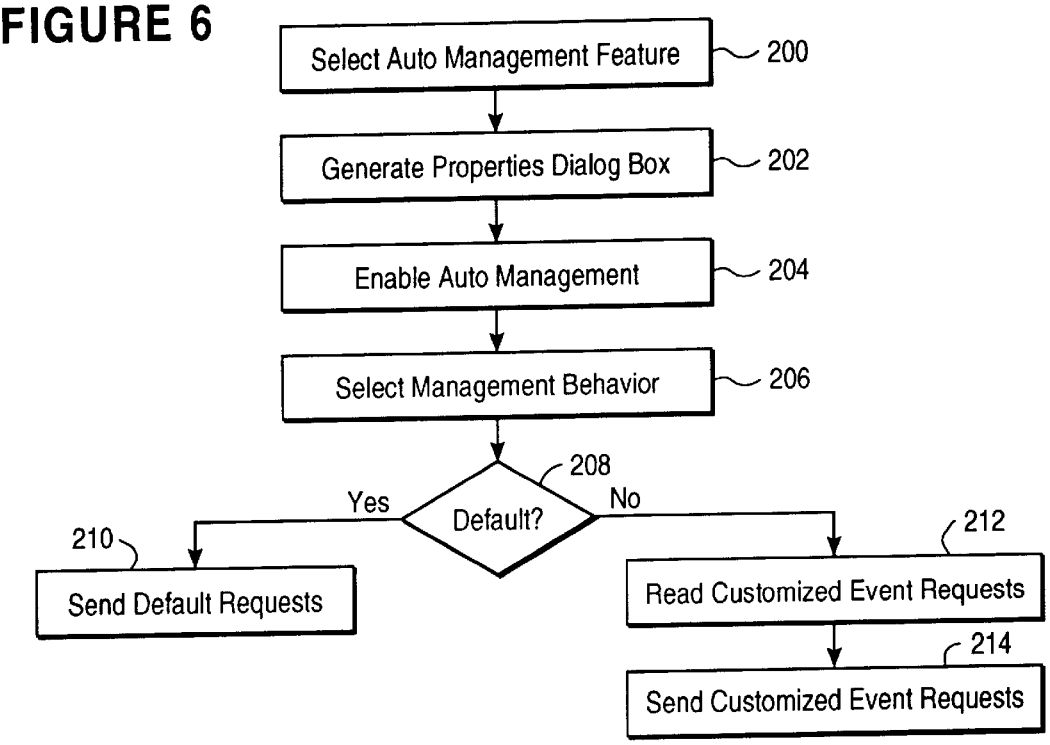

FIG. 6 shows the steps for monitoring the health of the network. The user selects the Auto Management feature 46 from the menu bar of the Console Program 44 (step 200)and the network manager 26 generates the Properties dialog box (step 202). The user enables Automatic Management (step 204) and selects a Management Behavior (step 206). If the user selects Default behavior (step 208), the network manager 26 sends the default event requests at every polling interval to the devices 20, 22, 24 and 25 indicated in the network topology database 42 (step 210). If the user selects Custom behavior, the network manager 26 reads the customized event requests from the network topology database 42 (step 212) and sends the customized event requests at every polling interval to the devices 20, 22, 24 and 25 indicated in the network topology database 42 (step 214).

FIG. 7 shows the steps for creating customized requests. The user clicks on the Customize button from the Auto Management feature 46 (step 300). The network manager 26 reads the components from the network topology database 42 (step 302) and the predefined event requests from the Predefined Request file stored in the non-volatile memory 38 (step 304). Then the network manager 26 generates the Customize popup dialog box, which displays the columns of components and predefined event requests (step 306). The user creates a customized request by selecting a component and associating it with a predefined event request (step 308). The network manager 26 displays the associated pair, that is, the customized request in a separate column(step 310). The network manager 26 also stores the customized request in the network topology database 42 in the instance file of the associated component (step 312).

FIG. 8 shows the steps for creating a predefined event request. The user clicks on the Create Predefined Request button from the Customize popup dialog box (step 400) and the network manager 26 generates the Create Request window 50 (step 402). The Create Request window 50 displays the fields of a predefined event request (step 404). The name of the predefined event request and the variable/threshold pair(s) for the attributes list are filled in by the user (step 406). After the fields are filled out, the user clicks on the Save button and the predefined event request is added to the Predefined Request file in non-volatile RAM 38 (step 408). The destination address for the predefined event request is filled in when the predefined event request is actually sent.

Thus disclosed is a customized apparatus and method that provides flexibility in monitoring an internet, a subnetwork or even a particular device on a network. Events can be defined by the network administrator, and each request can be configured for a specific device.

It is understood that various changes and modifications may be made without departing from the spirit and scope of the invention. The invention is not limited to the internet configuration shown in FIG. 1. Moreover, the invention is not limited to network managers including workstations having RISC processors that run "UNIX"-based operating systems. For example, the network manager can include a personal computer having an x86 or "PENTIUM" processor that runs a 32-bit "UNIX"-based operating system such as "SOLARIS" 2.4. The operating system does not even have to be "UNIX"-based.

The software for the network manager is not limited to the objects or the object-oriented design shown in FIG. 3. The software can be developed according to any methodology and any programming language. The Console program 44 is not limited to a GUI for displaying the elements and generating and firing the event requests. Display, generation and firing can be performed directly by the Console program 44.

Accordingly, the present invention is not limited to the precise embodiments described hereinabove. Instead, it is defined by the claims that follow.

We claim:

1. A method of monitoring a plurality of network devices, comprising the steps of:

reading a plurality of predefined event requests from computer memory;

each predefined event request including at least one variable/threshold pair where the variable in each pair corresponds to a variable whose value is stored in a respective network device's Management Information Base and the threshold in each pair is a threshold value for the variable in that pair; each variable/threshold pair defining an event corresponding to the variable in the pair reaching a value having a predefined relationship to the threshold in the pair;

in response to a user request,
displaying a list of devices, and
displaying a list of predefined event requests;

in response to user customization commands, generating customized event requests by associating various ones of the displayed devices with various ones of the displayed predefined event requests, wherein at most one respective predefined event request is associated with each device;

periodically sending the customized event requests to the devices with which they have been associated;

receiving response messages from the devices in accordance with the predefined event requests sent to the devices; and indicating status of the responding devices according to the response messages that are received.

2. The method of claim 1, further comprising the step of generating at least one of the predefined event requests by forming a variable/threshold pair and storing it in a predefined event request data structure.

3. The method of claim 1, further comprising the step of generating at least one predefined event request by forming a plurality of variable/threshold pairs and storing the formed pairs in the event request, such that multiple events for the associated device are defined.

4. The method of claim 1, wherein the step of generating is performed by selecting a device from the list of devices and a predefined event request from the list of predefined event requests to be associated with the selected device, wherein the selecting step is performed one time for a device in the list of devices.

5. The method of claim 1, further comprising the steps of:

generating a graphical user interface having means for a user to select custom automatic management; and reading, generating and sending the customized event requests when custom automatic management is selected; and sending default event requests to the devices when custom automatic management is not selected.

6. The method of claim 1, further comprising the steps of:

monitoring at least some of the devices;

displaying the devices that are being monitored, the displayed devices being represented by glyphs; and color-coding the glyphs to indicate the status of the devices being monitored.

7. An apparatus for automatically monitoring a plurality of devices on a network, comprising:

memory for storing a plurality of different predefined event requests; and each predefined event request including at least one variable/threshold pair where the variable in each pair corresponds to a variable whose value is stored in a respective network device's Management Information Base and the threshold in each pair is a threshold value for the variable in that pair; each variable/threshold pair defining an event corresponding to the variable in the pair reaching a value having a predefined relationship to the threshold in the pair;

a processor for reading the predefined event requests from the memory, in response to a user request,
displaying a list of devices, and
displaying a list of predefined event requests;

generating a customized event request by associating at least one of the displayed predefined event requests with at least one of the displayed devices in response to user customization commands, wherein at most one respective predefined event request is associated with each device, and periodically, at a defined polling interval, transmitting the customized event request to the respective device;

receiving response messages from the devices in accordance with the predefined event requests sent to the devices; and indicating status of the responding devices according to the response messages that are received.

8. The apparatus of claim 7, wherein the processor also generates the predefined event requests and stores the generated predefined event requests in the memory.

9. The apparatus of claim 8, wherein the processor generates each predefined event request by receiving at least one variable/threshold pair and writing each received pair in a predefined event request data structure.

10. The apparatus of claim 8, further comprising a video monitor and at least one input device, wherein the processor generates a graphical user interface for receiving the at least one variable/threshold pair and for allowing the event requests to be associated with the devices.

11. The apparatus of claim 10, wherein the processor selectively displays glyphs representing the devices on the video monitor, and wherein the processor color-codes the glyphs to indicate status of the displayed devices.

12. The apparatus of claim 8, wherein the processor is programmed to:

display glyphs representing the devices receive responses from the devices; and display status of the devices based on the received responses.

13. The apparatus of claim 12, wherein the processor is programmed to indicate status by color-coding the glyphs.

14. The apparatus of claim 8, wherein the processor generates a graphical user interface having means for a user to select custom automatic management; and reads, generates and sends the customized event requests when custom automatic management is selected, and wherein the processor sends default event requests to the devices when custom automatic management is not selected.

15. A computer program product for monitoring a plurality of network devices, the computer program product comprising a computer readable storage medium and a computer program mechanism embedded therein, the computer program mechanism comprising:

a plurality of different predefined event requests; and each predefined event request including at least one variable/threshold pair where the variable in each pair corresponds to a variable whose value is stored in a respective network device's Management Information Base and the threshold in each pair is a threshold value for the variable in that pair; each variable/threshold pair defining an event corresponding to the variable in the pair reaching a value having a predefined relationship to the threshold in the pair;

a first set of instructions that read the predefined event requests from a memory, a second set of instructions that in response to a user request, display a list of devices, and display a list of predefined event requests, and generate customized event requests by associating various one of the displayed predefined event requests with various ones of the displayed devices in response to user customization commands, wherein at most one respective predefined event request is associated with each device, and a third set of instructions that periodically, at a defined polling interval, transmit the customized event request to the respective devices;

a fourth set of instructions that receive response messages from the devices in accordance with the predefined event requests sent to the devices; and a fifth set of instructions that indicate status of the responding devices according to the response messages that are received.

16. The computer program product of claim 15, further comprising a sixth set of instructions that generate the predefined event requests and stores the generated predefined even requests in the memory.

17. The computer program product of claim 16, further comprising instructions that generate each predefined event request by receiving at least one variable/threshold pair and writing each received pair in a predefined event request data structure.

18. The computer program product of claim 16, further comprising instructions that generate a graphical user interface for receiving the at least one variable/threshold pair and allow the predefined event requests to be associated with the devices.

19. The computer program product of claim 18, further comprising instructions that display glyphs representing the devices on a video monitor, and color-code the glyphs to indicate status of the displayed devices.

20. The computer program product of claim 16, further comprising instructions that:

display glyphs representing the devices;

receive responses from the devices; and display status of the devices based on the received responses.

21. The computer program product of claim 20, further including instructions that indicate status by color-coding the glyphs.

22. The computer program product of claim 16, further including instructions that generate a graphical user interface having means for a user to select custom automatic management; and read, generate and send the customized event requests when custom automatic management is selected, and that send default event requests to the devices when custom automatic management is not selected.

* * * * *